United States Patent [19]

Armstrong

[11] Patent Number: 5,589,828
[45] Date of Patent: Dec. 31, 1996

[54] 6 DEGREES OF FREEDOM CONTROLLER WITH CAPABILITY OF TACTILE FEEDBACK

[76] Inventor: Brad A. Armstrong, 6630 Arabian Cir., Roseville, Calif. 95661

[21] Appl. No.: 847,619

[22] Filed: Mar. 5, 1992

[51] Int. Cl.[6] .................................................. G05G 9/00
[52] U.S. Cl. .......................... 341/20; 345/161; 200/6 A; 74/471 XY
[58] Field of Search ....................... 341/20, 21; 345/156, 345/157, 161; 318/145; 200/6 A; 74/471 XY

[56] References Cited

U.S. PATENT DOCUMENTS

| | | | |
|---|---|---|---|
| 2,430,284 | 11/1947 | Evers | 341/20 |
| 3,693,425 | 9/1972 | Starita et al. | 73/862.044 |
| 3,921,445 | 11/1975 | Hill et al. | 73/862.043 |
| 4,099,409 | 7/1978 | Edmond | 73/862.043 |
| 4,216,467 | 8/1980 | Colston | 341/20 |
| 4,297,542 | 10/1981 | Shumway | 200/6 A |
| 4,348,142 | 9/1982 | Figour | 414/2 |
| 4,369,663 | 1/1983 | Venturello et al. | 73/862.043 |
| 4,414,537 | 11/1983 | Grimes | 341/20 |
| 4,536,746 | 8/1985 | Gobeli | 341/20 |
| 4,555,960 | 12/1985 | King | 74/471 XY |
| 4,670,743 | 6/1987 | Zemke | 74/471 XY |
| 4,684,089 | 8/1987 | van der Lely | 248/124 |
| 4,811,608 | 3/1989 | Hilton | 73/862.043 |
| 4,855,704 | 8/1989 | Betz | 341/20 |
| 4,910,503 | 3/1990 | Broadsky | 341/35 |
| 4,935,728 | 6/1990 | Kley | 341/35 |
| 5,128,671 | 7/1992 | Thomas, Jr. | 341/20 |
| 5,142,931 | 9/1992 | Menahem | 74/471 XY |
| 5,168,221 | 12/1992 | Houston | 74/471 XY |
| 5,189,355 | 2/1993 | Larkins et al. | 318/145 |
| 5,252,952 | 10/1993 | Frank et al. | 345/157 |
| 5,329,276 | 7/1994 | Hirabayashi | 341/20 |

FOREIGN PATENT DOCUMENTS

| | | |
|---|---|---|
| 0205726 | 12/1986 | European Pat. Off. . |
| 739505 | 12/1977 | U.S.S.R. . |
| 2205941 | 12/1988 | United Kingdom . |
| 2240614 | 8/1991 | United Kingdom . |

OTHER PUBLICATIONS

"Mouse Ball–Actuating Device with Force and Tactile Feedback", IBM Disclosure Bulletin, vol. 32, No. 9B, Feb. 1990, pp. 230–235.
Research Disclosures, vol. 283, Nov. 1987 (USA) "Joystick with Tactile Feedback".

*Primary Examiner*—John K. Peng
*Assistant Examiner*—Andy Hill

[57] ABSTRACT

Described and shown is a six degree of freedom physical to electrical converter with capability of tactile feedback, specifically, a human hand operated input controller with the capability of vibration feedback in the handle. Two embodiments, each capable of translating complex three dimensional linear and rotational forces into their constituent orthogonal vectors are described and shown. Also described and shown are various different sensor types which can be implemented in the embodiments. The embodiments have physical space between sensors and actuators maintained by resilient means, enabling tactile feedback (vibration) to be induced directly in the handle without erroneously activating sensors.

18 Claims, 10 Drawing Sheets

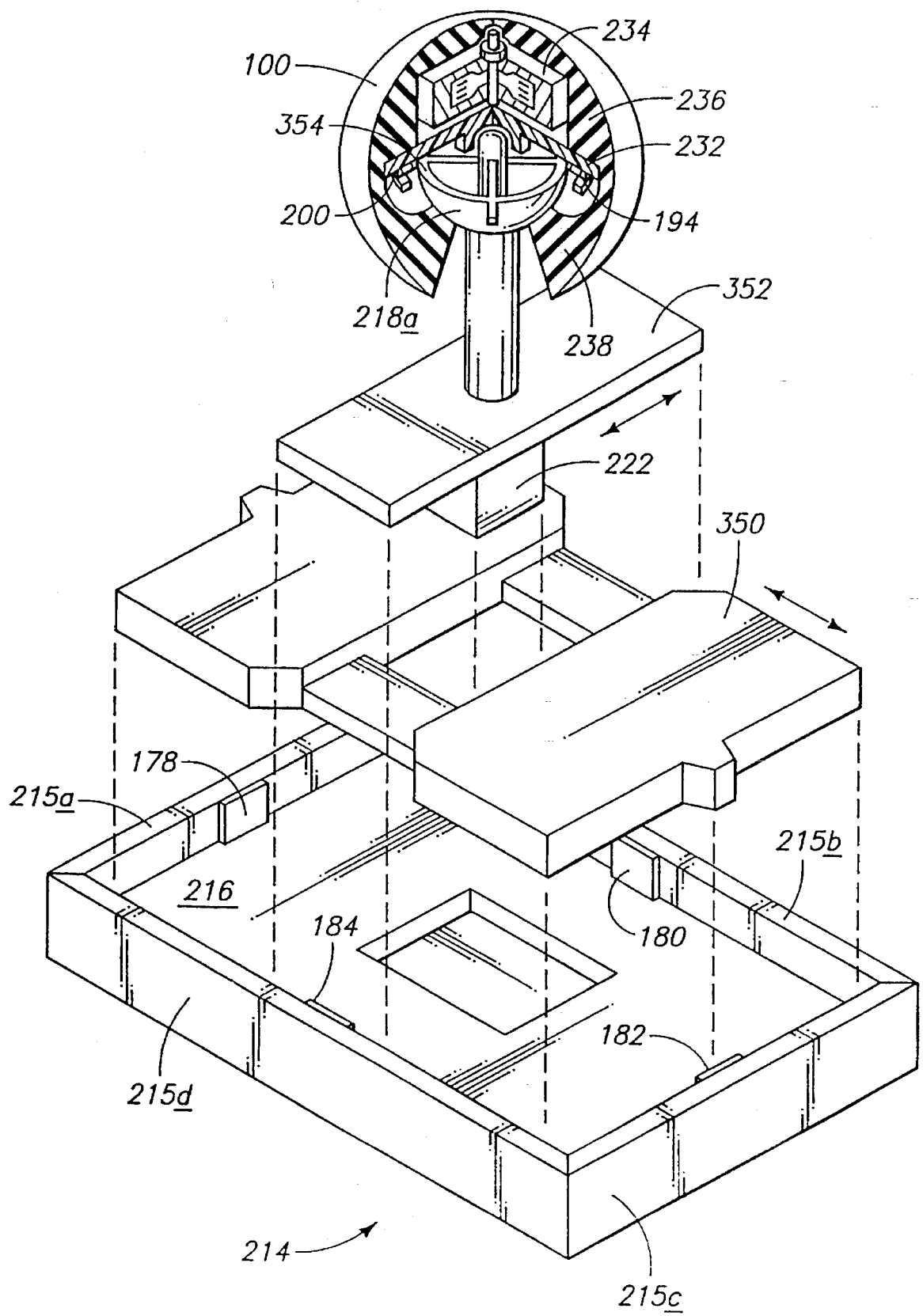

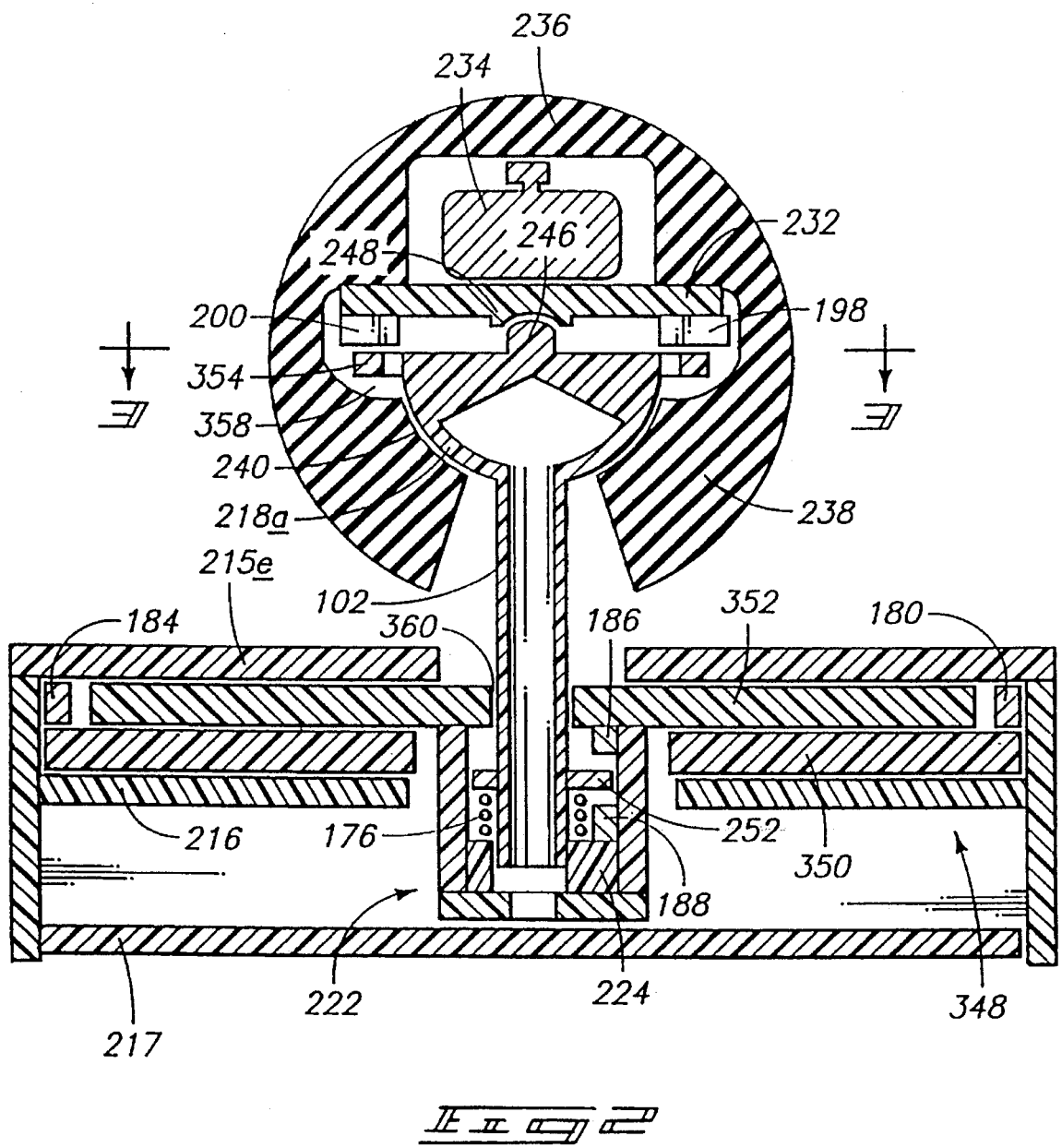

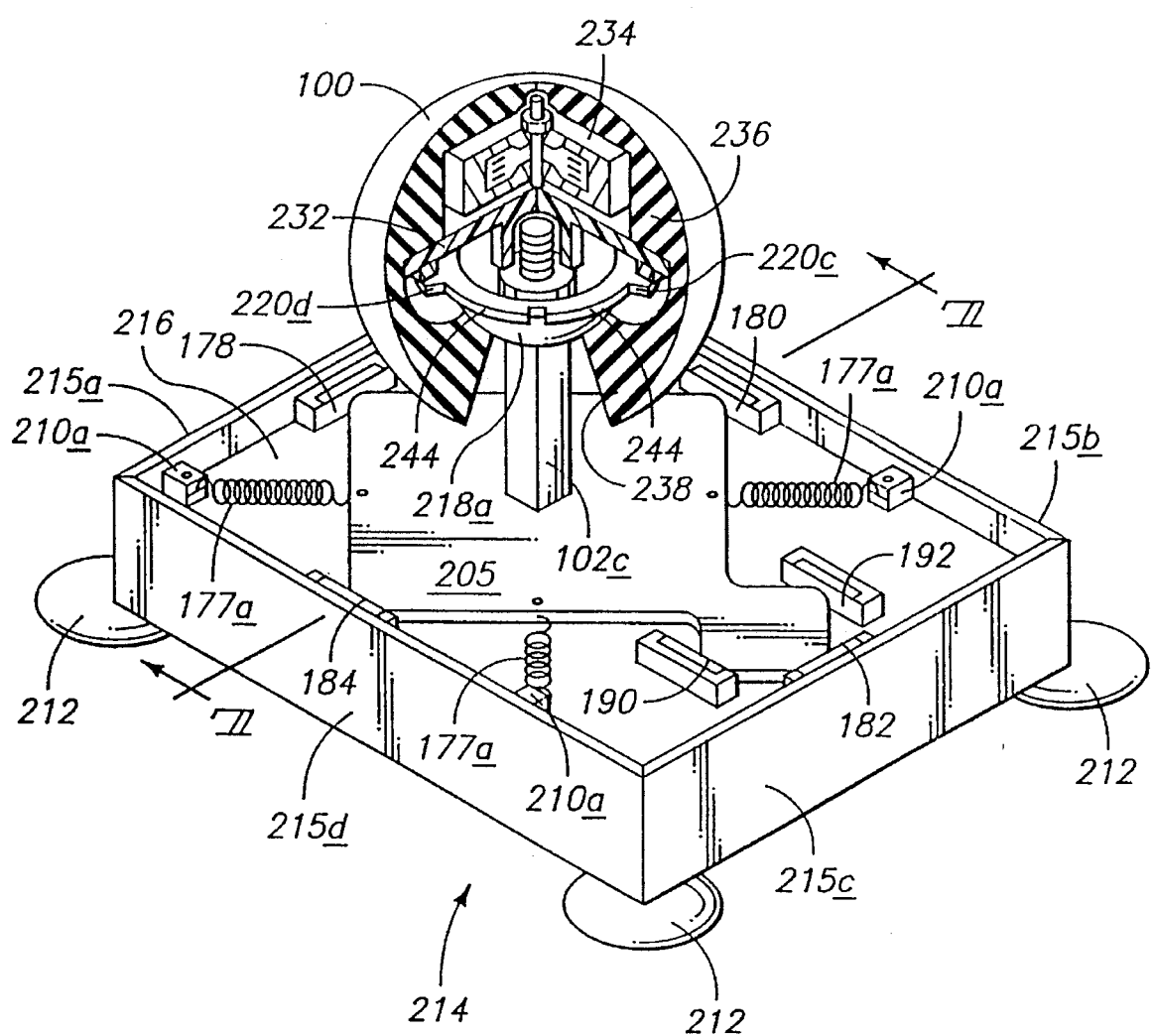

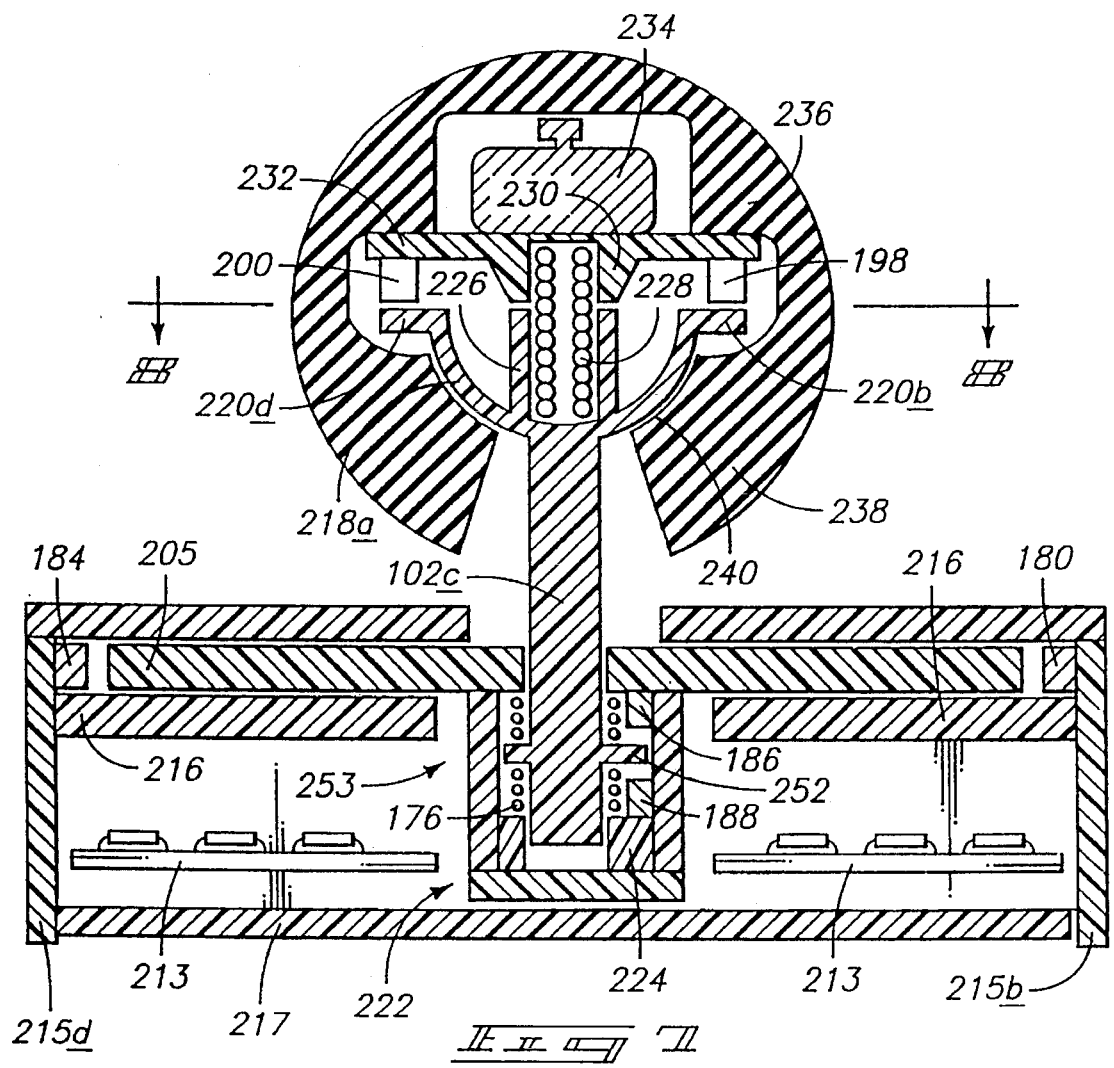
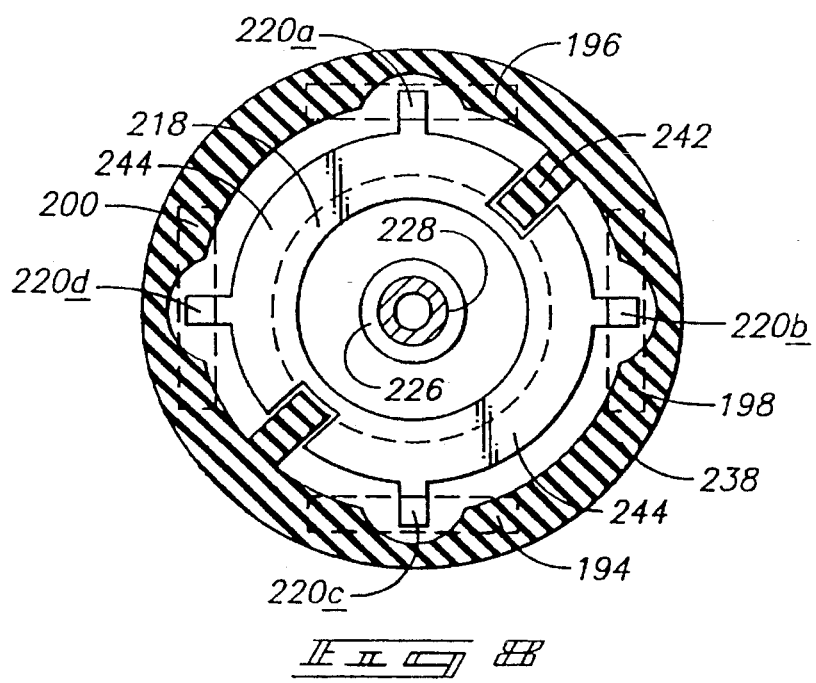

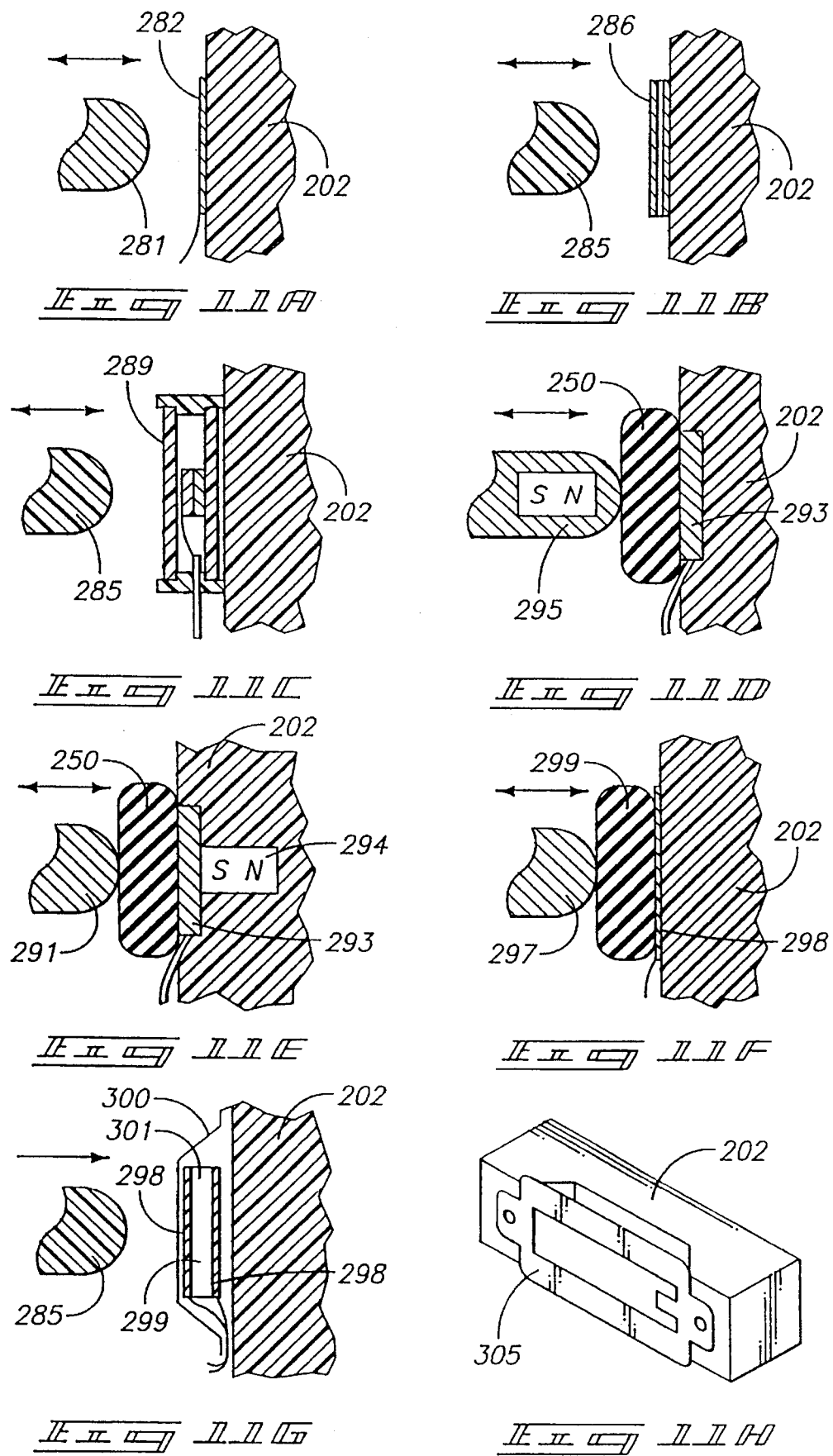

6 DEGREES OF FREEDOM CONTROLLER WITH CAPABILITY OF TACTILE FEEDBACK

BACKGROUND—FIELD OF INVENTION

This invention relates to an interactive computer device having six degrees of freedom input and tactile feedback output, specifically, an interactive computer device to be operated by the human hand.

BACKGROUND—DESCRIPTION OF PRIOR ART

A variety of controllers having six degrees of freedom (hereinafter "6-DOF") have been described in the prior art.

In large part, the prior art has been dedicated to feedback mechanisms for robotic arms. Work done in this field, such as U.S. Pat. No. 3,693,425 to Starita and Macosko, U.S. Pat. No. 4,369,663 to Venturello et al, U.S. Pat. No. 4,099,409 to Edmond, and U.S. Pat. No. 3,921,445 to Hill et al, falls short of the optimum as a hand operated device. Robotic sensors need to be highly precise, allowing no unresponsive play of actuator mechanisms. On the contrary, a human hand input device optimally has built-in tolerance to allow for tactile feedback vibrations and to compensate for imprecisions of the human hand. The prior art falls short on these considerations and on basic considerations such as sensor cross-talk, thermal stability, computational overhead, excessive electronic arbitration of sensors, and economy of manufacture.

A number of prior art inventions relate to determining signature verification, such as U.S. Pat. No. 4,536,746 to Gobeli. Prior art of this type is generally insufficient for the above stated reasons and for its lack of full 6-DOF capability.

Prior art devices of a "joystick" type of hand operated controllers such as U.S. Pat. No. 4,297,542 to Shumway, and U.S. Pat. No. 4,684,089 to van der Lely are also insufficient for the above stated reasons, specifically this art lacks true 6-DOF capability and tactile feedback capability.

Other commonly available prior art devices such as the Mouse, the Track Ball, and the Touch Screen are all 2D input devices incapable of 6-DOF input necessary for control in a 3D environment.

Prior art devices using a polhemus sensor, including the data glove, U.S. Pat. No. 4,414,537, fall short of the optimum for hand operated controllers in that they are absolute position devices. Such devices require a large range of physical world movement which is undesirable for this kind of interactive device because of two main deficiencies. First, users of these devices complain of a "tired-arm" syndrome, which results from the necessity of holding one's hand (or an object containing the polhemus sensor) in an elevated position for prolonged periods. Second, the virtual environment with which the user is interacting does not have the physical limitations of the real world, thus the operators hand may conflict with real world objects and limitations that do not exist in the virtual environment. A third deficiency, specific to the data glove, is that it requires emense and unnecessary software complexity.

An additional work of prior art is the Dimension-6 line of computer controllers as marketed by CIS Graphics of Westford, Mass. These devices, while having a full 6-DOF capability, have no capacity for the incorporation of vibration as tactile feedback. These devices are dependent on optical sensors and vibration of the handle will create a wildly fluctuating output signal. Further, with no sensor isolation, these devices suffer from sensor cross-talk, making them unforgiving to the imprecisions of human hand input.

It will be seen in the objects and advantages of the current art that the above weaknesses of the prior art are entirely overcome.

OBJECTS AND ADVANTAGES

In order for a user to intuitively manipulate objects and/or navigate a viewpoint within a three-dimensional Virtual Reality, it is necessary to directly translate natural physical stimuli into similar Virtual "action".

As will become appreciated with reading detailed descriptions explaining structures in accordance with the present invention and with an examination of the drawings, in order to ideally intuitively manipulate objects and/or navigate a viewpoint such as within a three-dimensional Virtual Reality display or like computer display using a hand-input full six degrees of freedom controller, it is desireable to use a hand input controller which allows all of the six degrees of freedom to all be input directly into the controller through a single handle. Additionally, a truly intuitive 6-DOF controller having all inputs through the single handle is one which allows the hand inputs against the handle to move the controller handle and also preferably the object (or viewpoint) on the display only (exclusively or purely) in the direction of the hand input force against the handle. For example, if the user viewing a selected object wishes to rotate the object clockwise, then the user would ideally need only apply clockwise rotational force to the handle, and ideally the handle and preferably the object would both only rotate clockwise, not moving linearly or about another axis in some direction not intended by the user which would be confusing to the user. Such a relationship of the handle and preferably also the object of the display moving only in the direction of hand input force against the handle would ideally be true for all of the six degrees of freedom. To be truly intuitive, i.e., not confusing to the user, the direction of the hand input force against the handle moves the handle and preferably also the object of the display only in the direction of the force applied to the handle, and to provide such a controller is an object of the present invention. A truly intuitive full six degrees of freedom controller essentially, at least from one view point, allows a direct link between the user's mind, hand, 6-DOF controller and object or viewpoint in the display.

A primary object of this invention is to provide means of inputing commands with six degrees of freedom while providing the advantage of tactile feedback to the user. Such feedback could be employed, for example, in the case that the user attempts to pass through a blockage or make some other illegal movement input. In the real world, if a person touches one object with another he or she senses the physical contact with his or her hand. With this invention, when movement results in "contact" the ball gently vibrates. The mind naturally interprets this vibration as normal tactile feedback, thus this invention offers a rich natural interaction with the electronic environment.

Another object of this invention is to provide means of inputing commands with six degrees of freedom while providing the advantage of having spatial sensor isolation. Such isolation is a definite advantage in that it eliminates potential error from vibration and from inaccurate human input. Unlike in the prior art, the sensor isolation of this invention allows the advantage that the handle can vibrate for tactile feedback without producing any unwanted signals which might otherwise be caused by the vibration of the tactile feedback falsely triggering sensors. Also unlike in the prior art, the sensor isolation of this invention allows tolerance that forgives the imprecisions of human-hand input.

Another object of this invention is to provide means of mechanically translating full 6-DOF physical real-world motion directly into electrical outputs or electrical output signals. Since each sensor of these teachings is directly associated with exactly one of twelve orthogonal mechanical outputs, wherein twelve sensors are preferably used, one sensor per each of the twelve orthogonal mechanical outputs, no additional circuitry or computational power is required to resolve signals into vector components.

The twelve orthogonal mechanical outputs equal a first, a second, a third, a fourth on up through a twelfth mechanical output, with these representing and corresponding to the twelve orthogonal movements of true and full six degrees of freedom bidirectionally of three mutually perpendicular axes. The advantages of mechanically translating full 6-DOF into twelve orthogonal mechanical outputs of the controller are numerous, and include ease in applying a separate sensor to each of the twelve outputs, and applying spatial sensor isolation means to each of the twelve sensors, which in turn provides forgiveness for human hand inaccuracies and further allows ease in effective use of substantial vibration as tactile feedback without falsely triggering sensors. Another advantage of mechanically translating full 6-DOF into twelve orthogonal mechanical outputs is that it allows for a much wider range of sensor types to be utilized, including very inexpensive open/close contact switches or many other types of more sophisticated sensors.

Additionally, this invention provides the advantage of sensor independence. Unlike the prior art, this invention is an input device that has physical manifestations that can stimulate any of various types of sensors. While the prior art is dependent upon specific types of sensors, this invention can be constructed with sensors as inexpensive as simple electrical contacts or as sophisticated as a manufacturer desires.

Another advantage of this invention is with regard to its economy of manufacture. Traditionally, three-dimensional graphics computers have not been price sensitive, but the price is rapidly falling and will soon be an important consideration. The physical structure of this invention can be manufactured for only a very minimal cost in injection-molded parts.

Another object of this invention is to provide means of inputing commands with six degrees of freedom while providing the advantage of intuitive input. This invention directly translates natural physical stimuli into similar virtual "action". Fortunately, since we live in a three-dimensional world, natural movements serve well as direct commands. For example, to rotate clockwise a selected object, one must simply apply clockwise pressure to the handle. All commands are equally intuitive and easy to use.

Another object of this invention is to provide means of inputing commands with six degrees of freedom while providing the advantage of a stationary input position for the user. Unlike the prior art, such as devices using the polhemus sensor (eg. the data glove), which are absolute position devices, the current invention is a relative position device. A relative position device has many advantages over an absolute position device. Six degree of freedom input devices are often controllers of a virtual or imaginary electronic world. These virtual worlds can be likened to dream worlds of unlimited scope. An operator in these virtual worlds still exists in a real world with physical limitations. Just like when someone is in a dream and the brain turns off all motor activity so that the dreamer does not conflict with the physical limits of the real world, it is important also for someone in a virtual world to have no conflict with the physical limitations of the real world. Unlike absolute positioning devices which require a large range of real world movement to control the virtual world, this invention requires minimal real world movement of the handle relative to a stationary base or support base. An additional benefit of this advantage is that the hand and arm of the user remain in a comfortable and rested position during operation. This is in marked contrast to an absolute position device such as the data glove in which the operators arm becomes quickly fatigued from movement and the necessity of maintaining the users hand in an elevated position.

Another object of this invention is to provide means of inputing commands with six degrees of freedom while providing the advantage of versatility of complex movements. This invention is fully featured. All three perpendicular Cartesian coordinates are interpreted bidirectionally, as are the rotations about each axis. These linear and rotational vectors can be combined in every possible way. This feature of all possible vector combinations allows this invention to describe every possible motion in three dimensions.

As those skilled in the art understand, true full six degrees of freedom inherently includes three linear degrees of freedom and three rotational degrees of freedom, with these being simplistically described as two horizontal linear degrees of freedom perpendicular to one another, and a third linear degree of freedom being a vertical linear degree of freedom wherein the horizontal first and second linear degrees of freedom are mutually perpendicular to the third linear degree of freedom, and with the first, second and third linear degrees of freedom being describable in terms of three axes all mutually perpendicular to one another and intersecting one another at a point. The three rotational degrees of freedom inherent to true full 6-DOF are rotations about or within these three mutually perpendicular axes. Also inherent to true full 6-DOF is the ability to move along linearly (translationally) and about (rotationally) these three mutually perpendicular axes bidirectionally and orthogonally. In the above simplistic description using the terms "horizontal" and "vertical" axes of the 6-DOF, the horizontal and vertical hypothetical positioning would be most commonly used and assumed here on Earth when manipulating an object or viewpoint of a display, however these three mutually perpendicular axes may of course be tilted from horizontal and vertical as would be the case in outer space.

Another object of this invention is to provide hand-operated control means for physical, real-world machines, such as forklifts, aircraft, spacecraft, etc.

Further objects and advantages of this invention will become evident upon consideration of the following descriptions and drawings.

DESCRIPTION OF DRAWINGS

FIG. 1 is a partially exploded perspective view showing the preferred embodiment.

FIG. 2 shows a median section view of the preferred embodiment and showing one single handle above the base.

FIG. 6 shows a perspective view of a second embodiment.

FIG. 7 shows a section view of the second embodiment from line I—I of FIG. 6.

FIG. 8 shows a section view of the second embodiment from line II—II of FIG. 7.

FIG. 11 a,b,c,d,e,f,g,&h show some sensor types that are possible for use in the current art.

REFERENCE NUMERALS (Part Numbers)

Figure 3A:
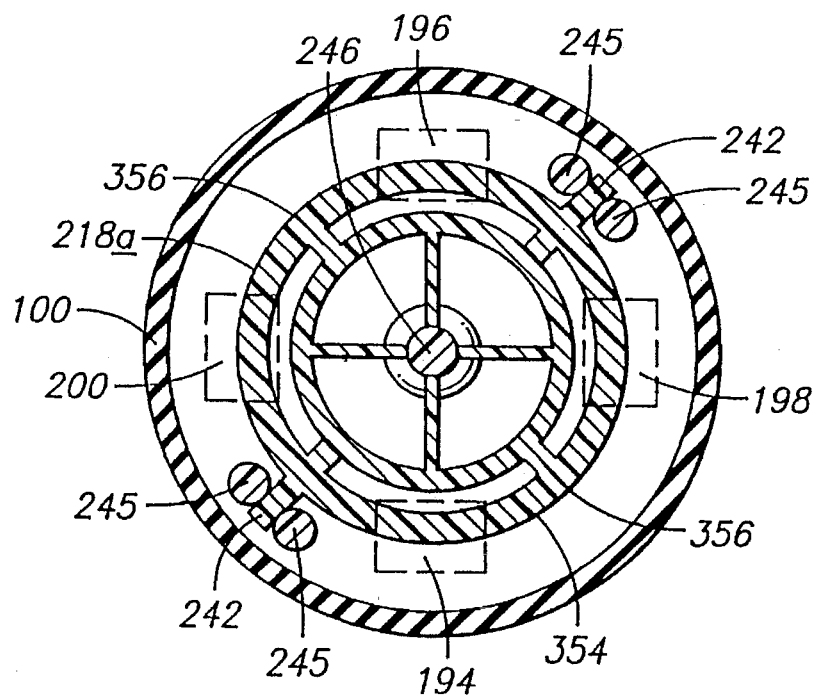
FIG. 3a,b show a horizontal section view as drawn from line II—II of FIG. 2.

100 Handle (ball- or otherwise-shaped)
102 Shaft
102c Square shaft (or non-round shaft)
176 Shaft spring (or other resilient means)
177a Tension spring
178 Move forward sensor
180 Move right sensor
182 Move back sensor
184 Move left sensor
186 Move up sensor
188 Move down sensor
190 Turn right sensor
192 Turn left sensor
194 Turn up sensor
196 Turn down sensor
198 Turn clockwise sensor
200 Turn counter-clockwise sensor
202 Sensor mount
205 Sliding platform
210a Spring mount
212 Suction cup mount
214 Base assembly
215a Forward wall of base assembly 214
215b Right wall of base assembly 214
215c Rear wall of base assembly 214
215d Left wall of base assembly 214
215e Top of base assembly 214
216 Retaining shelf
217 Base assembly floor
218 Partial spherical section
218a Hollow lower partial sphere
220a Forward actuator tab on 218a
220b Right actuator tab on 218a
220c Rear actuator tab on 218a
220d Left actuator tab on 218a
222 Sub-assembly
224 Lower shaft guide
226 Lower pivot-spring cylinder
228 Pivot-spring
230 Upper pivot-spring cylinder
232 Upper platform
234 Tactile feedback means
234a Motor with an offset weight on its shaft
236 Handle upper hemisphere
238 Handle lower hemisphere
240 Partial inverse-sphere guide
242 Turn-stop tab
242a Turn-stop tab actuator
244 Turn-stop ear
245 Turn-stop post
246 Male pivot protrusion
248 Female pivot receptacle
250 Resiliant means (springs, rubber, foam, etc.)
252 Shaft actuator tab
281 Electrically active actuator
282 Electrical contact surface
285 Actuator
286 Piezo contact sensor
289 Piezo resistive pressure sensor
291 Ferrous actuator
293 Hall effect magnetic proximity sensor
294 Magnet
295 Magnetic actuator
297 Polarized actuator
298 Capacitive surface
299 Dielectric resilient means
300 Flexible hermetically sealed wrapper
301 Compressable capacitive sensor
305 Singing sensor
348 Sliding actuator plates assembly
350 Greater sliding plate actuator
350m Greater sliding plate actuator restraint
352 Lesser sliding plate actuator
352m Lesser sliding plate actuator restraint
354 Circular actuator (with integral resilient return means)
356 Circular actuator support attachment
360 Aperture for passage of shaft

DESCRIPTION AND OPERATION OF INVENTION

FIGS. 1, 2, and 3 show the preferred embodiment of this invention, which is a twelve-sensor device. Each sensor, being a separate and distinct sensor, is distinctly associated with a single orthogonal mechanical output vector. In FIG. 1, a base assembly 214 is shown for clarity without a top. Base assembly 214 is shown as an essentially rectangular structure showing forward wall 215a, a right wall 215b, a rear wall 215c, and a left wall 215d; however, base assembly 214 is in no way limited to being rectangular in shape. Inside base assembly 214 is shown a retaining shelf 216 which is positioned essentially on a horizontal plane.

In the vicinity of and essentially centered along the length of forward wall 215a is a move forward sensor 178. In the vicinity of right wall 215b is a move right sensor 180. In the vicinity of and essentially centered along the length of rear wall 215c is a move back sensor 182. In the vicinity of left wall 215d is a move left sensor 184.

The move forward, move back, move right, and move left sensors may singularly or jointly be referred to as linear sensors, linear force sensors, linear sensing means, linear force sensing means, or linear position sensors or linear position sensor means, as these first four sensors are used to sense the positions, and with some types of useful sensors, the force against also, of sliding-plate-linear-conversion means as it moves in a horizontal first linear degree of freedom, and in a horizontal second linear degree of freedom of the six degrees of freedom. Sliding-plate-linear-conversion means moves exclusively horizontally as determined by it being sandwiched between first and second portions of the base assembly 214 as will become more appreciated with continued reading.

Sliding-plate-linear-conversion means are sandwiched between retaining shelf 216, preventing downward movement, and top of the base assembly 215e here shown as a sliding actuator plates assembly 348 comprising two pieces of which the larger piece is a greater sliding plate actuator 350 which has within it a recess into which fits a lesser sliding plate actuator 352.

The top 215e and retaining shelf 216 of base assembly 214 may be called or referred to as first and second portions respectively, and in FIG. 2 it can be seen that top 215e is parallel to horizontal retaining shelf 216 and is thus horizontal also. Thus it can be ascertained from the drawings and the additional descriptions that sliding-plate-linear-conversion means is sandwiched horizontally and that plates 350 and 352 exclusively slide or move horizontally within the first and second horizontal linear degrees of freedom to actuate the first four linear sensors 178, 180, 182 and 184.

The shape of sliding-plate conversion means is not limited to the specific shape described above, but can be quite diverse, as will be shown later in this teaching. Sliding actuator plates assembly 348 is suspended in a position neutral to and spatially separated from sensors 178 through 184, 190, 192, thus providing excellent sensor isolation from any cross-talk, vibration, or other undesired input. In order to be as friction-free as possible sliding actuator plates assembly 348 may be made of very low surface-resistance material, such as Teflon or other materials having similar characteristics. The material means for low surface-resistance may also be applied as tape, runners, or feet for sliding actuator plates assembly 348. The low surface-resistance material means may also be applied to retaining shelf 216, and similar means may be applied to the bottom surface of top of the base assembly 214.

At the approximate center of lesser sliding plate actuator 352 is an aperture 360 through which passes vertically a shaft 102.

Figure 3B:
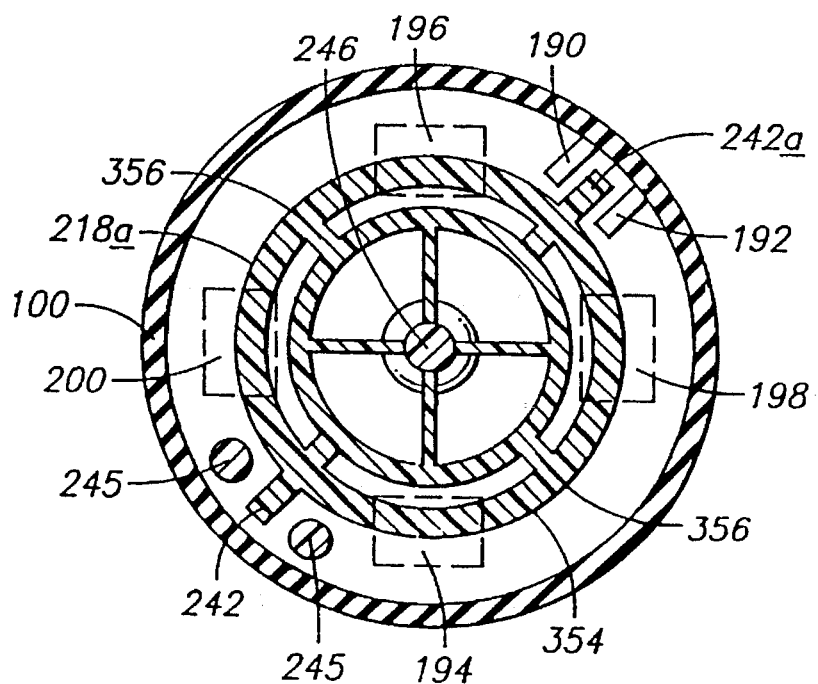
Figure 4A:
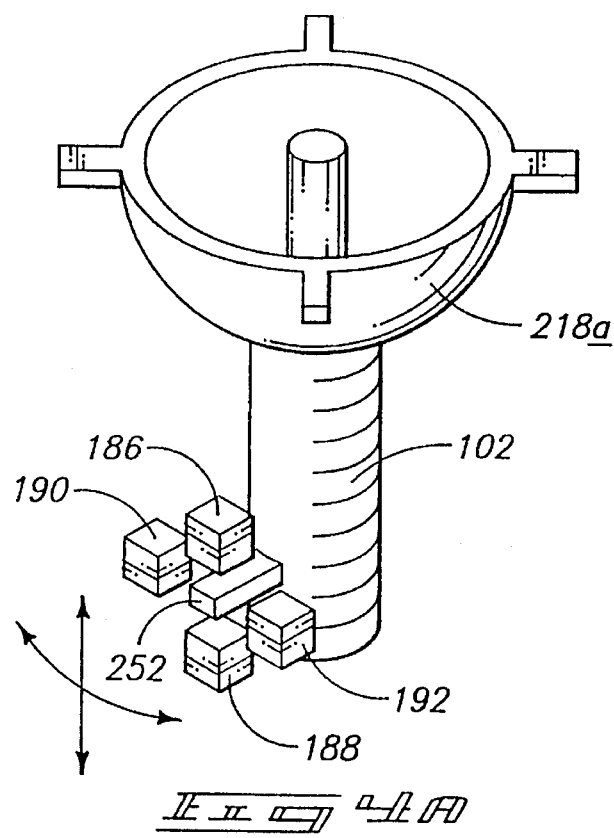
FIG. 4 a,b show a perspective view of two different locations for placement of turn left and right sensors.
Figure 4B:
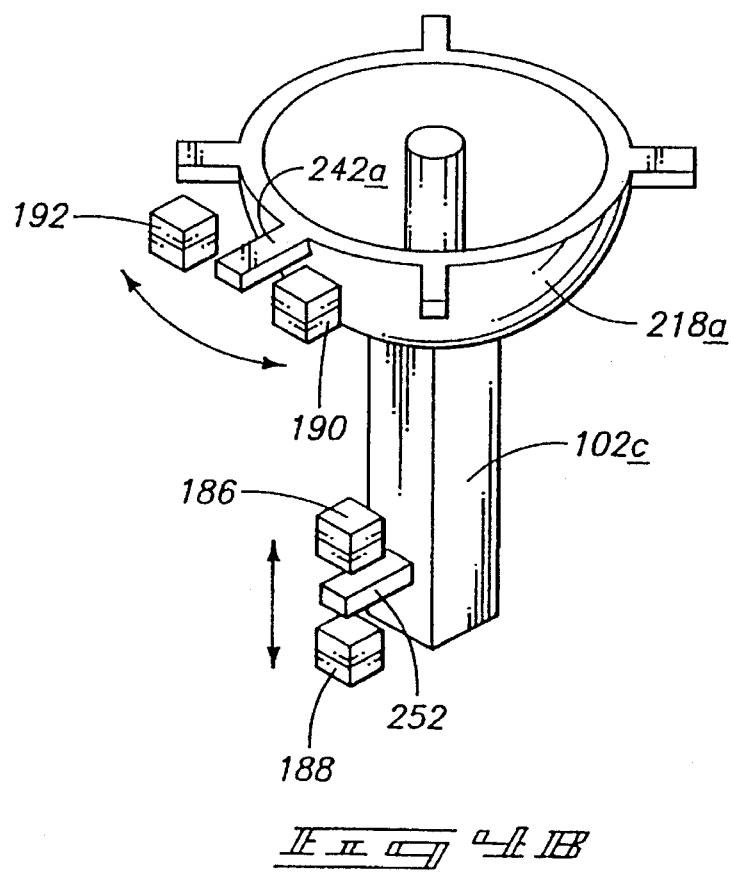

Shaft 102, or at least a lower end thereof, extends below the sliding actuator plates assembly 348 into a lower-shaft means sub-assembly 222, which is fixed to the lower side of lesser sliding plate actuator 352. Sub-assembly 222 comprises means for support of a rigidly fixed lower shaft guide 224, two independent sensors 186, 188, a move up sensor 186, a move down sensor 188, and a shaft actuator tab 252 centered with space between move-up sensor 186 and move-down sensor 188. From drawing FIGS. 1 and 2, and from this disclosure as a whole, it can be appreciated that shaft 102 is coupled to sliding-plate-linear-conversion means or the sliding actuator plates assembly 348 to move with sliding-plate-linear-conversion means at least in the horizontal first and second linear degrees of freedom. It can also be ascertained from the drawings and from these writings that shaft 102 is not operably tiltable, or in other words is not significantly or substantially tiltable since such tilting in this particular embodiment is not needed to actuate any of the twelve sensors, and would lead to a far less intuitive six degree of freedom controller as will become more appreciated with continued reading. In FIG. 2, shaft 102 is shown non-tiltably supported by an engagement of significant length with lower shaft guide 224 and with lesser sliding plate actuator 352 of sliding-plate-linear-conversion means for example, and both of these engagements allow vertical sliding of shaft 102 in this example, and thus some clearance between the parts is required for the sliding, and the clearance theoretically might allow an insignificant amount of tilting of shaft 102, being undetectable by the eye and hand, but such clearance should be maintained very small to eliminate any detectable or operable tilting of shaft 102 for all practical purposes. In other words, significant tilting of shaft 102 in this embodiment is highly undesirable. A variation of this embodiment within the scope of the lower-shaft means has shaft 102 rotationally fixed within handle 100 as shown in FIGS. 3a and 4a and with shaft 102 free to turn within aperture 360 of lesser sliding plate 352 and turn left sensor 192 and turn right sensor 190 located within subassembly 222 to both sides of shaft actuator tab 252 as indicated by FIGS. 3b and 4b. One skilled in the art will recognize many obvious variations possible within the scope of lower-shaft means. Combining the above described sliding-plate-linear-conversion means and lower-shaft-conversion means results in a fully featured base-linear-conversion means.

A base assembly floor 217 is removeably attached to the bottom of base assembly 214. As most of these parts will likely be injection molded they will probably not exhibit only the simple functionality shown here. For example the base assembly floor 217 may actually be produced as the whole lower half, or even more, of base assembly 214. The top of the base assembly 215e, which functions as means prohibiting the sliding plate actuators from upward vertical movement, may be realized as a simple functional structure, for example distending feet, that are not the actual top of base assembly 215e.

The upper end of shaft 102 is fixed to a partial spherical section 218, specifically, but not limited to a lower partial sphere 218a. Protruding from lower partial sphere 218a, near the plane of the horizontal equator, as shown clearly in FIGS. 3a and 3b are four circular actuator support attachments 356, extending orthogonally outward. Fixed to the support attachments 356 is a circular actuator 354. Protruding on opposite sides from circular actuator 354 are two turn-stop tabs 242 which are confined by four turn-stop posts 245 that are fixed within the ball-shaped handle 100 as shown in FIG. 3a. FIG. 3b shows a variation having one turn stop tab 242 that is not so closely constricted by turn-stop posts 245, and in place of the second turn-stop tab 242 is a turn-stop actuator 242a having turn left sensor 192 and turn right sensor 190 located to each side of turn-stop actuator 242a and fixed within handle 100.

Pivotal-conversion means are shown clearly by FIGS. 2 and 3, as shown in FIG. 2 fixed centrally to and rising vertically in the lower partial sphere 218a is a male pivot protrusion 246 which ends at substantially the plane of the horizontal equator of the lower partial sphere 218a. A female pivot receptacle 248 rests upon male pivot protrusion 246 and is an integral part of an upper platform 232. As shown clearly in FIG. 3, fixed about the upper platform 232 are four rotational or rotational force sensors 194, 196, 198, and 200, positioned horizontally and orthogonally in such a way as to be each one above circular actuator 354. In this embodiment it can be appreciated from the previous descriptions and the drawings that six independent rotational force or movement sensors are used to sense rotations or rotational force within the three, i.e. first, second and third rotational degrees of freedom of movement or force against the single handle 100, the single handle 100 being shown in drawing FIGS. 1 and 2. It can also be appreciated six independent linear force or linear position sensors are used to sense linear movement or force of or against the single handle 100, i.e., first and second linear sensors for the first horizontal linear degree of freedom which the handle 100 and sliding-plate-linear-conversions means moves within; a third and fourth linear sensor for the second horizontal linear degree of freedom which the handle 100 and sliding-plate-linear-conversions means moves within, and a fifth and sixth sensor for the vertical or third linear degree of freedom along which handle 100 can move relative to base assembly 214.

Upper platform 232 attaches in a fixed manner to the inside of handle upper hemisphere 236. Optionally, a tactile feedback means 234, a small electric motor with an offset weight on its shaft, can be fixed either to upper platform 232 or to the inside of handle upper hemisphere 236. Handle upper hemisphere 236 comprises a centrally located upper cavity of sufficient volume for containing tactile feedback means 234 and for allowing free rotation of the offset weight. A lower partial sphere 238 is fixed to handle upper hemisphere 236 in such a way as to form a ball-shaped handle 100. Lower partial sphere 238 would be a complete lower partial sphere, except for a conical or otherwise-shaped section removed from the lowest point of a lower partial sphere, thus allowing limited rotational movement of ball-shaped handle 100 in freedom from constriction by shaft 102c. On the inside of lower partial sphere 238 and immediately above the removed conical section is a partial inverse-sphere guide 240, which has only a slightly larger radius than the outside of lower partial sphere 218a.

Operationally speaking, one skilled in the art will recognize that this is a device for inputing six degrees of freedom which can be described by six mathematical vectors. One vector for each of the three linear cartesian coordinates, and another vector for a rotation about each axis, adding up to six vectors. Every vector can be either positive or negative, that is travel can be in either direction along or about the vector. In a practical sense this doubles the number into twelve common everyday outputs: MOVE forward or backward, left or right, up or down; and TURN left or right, up or down, and clockwise or counter-clockwise. The entire scope of movement in three dimensions is defined by these and combinations of these twelve outputs. All physically possible combinations of outputs are achievable by the designs of these teachings. However, in the interest of clarity, the following summary of outputs will deal only with the specific physical stimulations that cause single sensor outputs.

A linear force applied by a hand to handle 100 is transferred directly and correspondingly to shaft 102. If the linear force is applied in a forward, right, backward, or left direction (ie., a horizontal linear force), then the force is directly transferred from shaft 102 to sliding plates actuator assembly 348, causing either greater sliding plate actuator 350 or lesser sliding plate actuator 352 to move along the direction of the force thus impinging upon the appropriate sensor 178, 180, 182, or 184. It is clear in the drawing FIGS. 1 and 2, and from the above descriptions that shaft 102 is coupled to move with sliding-plate-linear-conversion means at least in the first and second horizontal linear degrees of freedom, and thus hand input force applied linearly against handle 100 corresponding to the first and second horizontal linear degree of freedom is transferred into shaft 102 and into said sliding-plate-linear-conversion means to move sliding-plate-linear-conversion means in the direction of the force applied by hand to handle 100. If the linear force is applied either upwardly or downwardly (ie., a vertical linear force), then the force directly causes shaft 102 to pass freely through aperture 360 in sliding plates assembly 348, along the direction of the force, thus causing shaft actuator tab 252 to activate appropriate sensor 186 or 188.

Assuming a standard x, y, z coordinate system: A rotational force applied by a hand to the handle 100 in either direction around the vertical y-axis (ie., turn left or turn right), slightly rotates handle 100 thus moving appropriate sensors 190 or 192 that are fixed within into contact with turn-stop actuator 242a distending from circular actuator 354. A rotational force applied by a hand to handle 100 in either direction around the horizontal x- or z-axis (ie., turn up, down, clockwise, counter-clockwise), causes handle 100 to rotate about the same axis as the force. Sensors 194, 196, 198, or 200, fixed inside handle 100, are activated by substantially stationary circular actuator 354.

FIG. 4 *a* & *b* show two possible positions for sensors 190, 192. Embodiments shown in these teachings comprise shaft 102. The consequence of this is that sensors 190 and 192 interpreting rotational forces around shaft 102 can be located in numerous obvious locations, thus arises shaft-rotational-conversion means with sensors either directly about shaft 102 as shown here in FIG. 4a, or about a platform such as a sliding platform 205 shown in FIG. 6, or about the outer rim of lower partial sphere 218a of FIG. 4b. The full range of all possible rotations transduced by this invention are termed rotational-conversion means which are comprised of shaft-rotational means and pivotal-conversion means.

Specifically, FIG. 4a shows shaft 102 having a shaft actuator tab 252 with turn right and turn left sensors 190 and 192 located within base assembly 214. FIG. 4b shows a square shaft 102c or any shaft 100 that is rotationally fixed within base assembly 214 and so turn right and left sensors 190, 192 are located about partial hemisphere 218a to each side of turn stop actuator 242a.

Figure 5A:
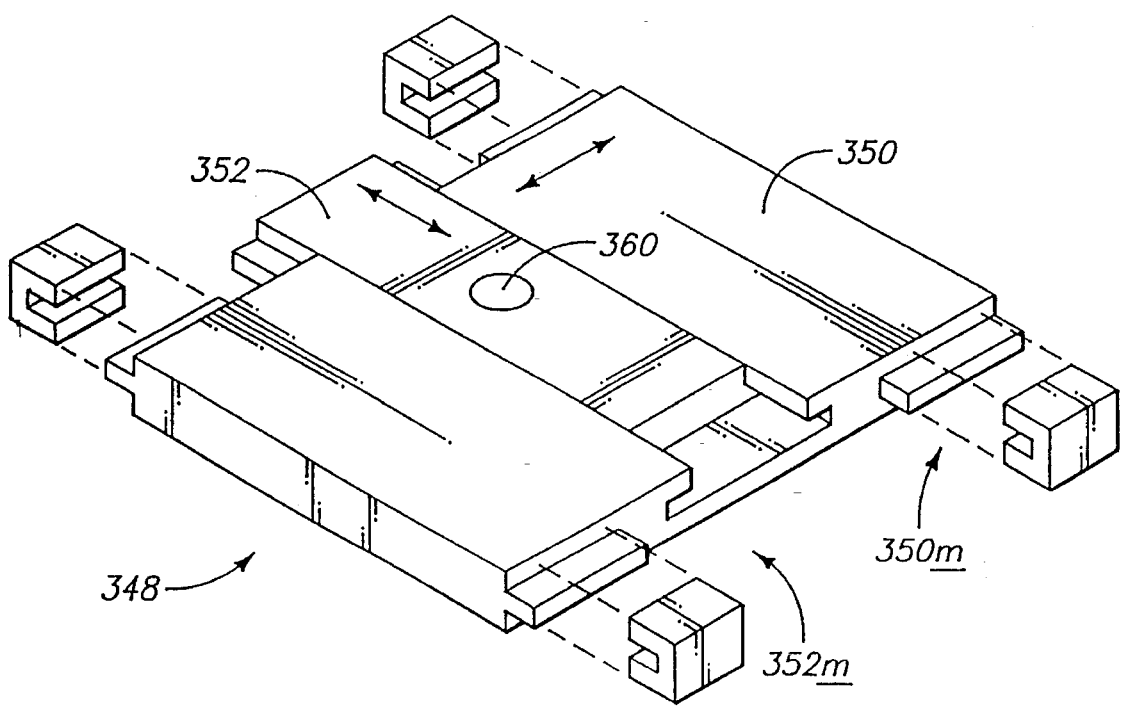
FIG. 5a,b show partially exploded views of alternate sliding plates actuator assemblies for the preferred embodiment.
Figure 5B:
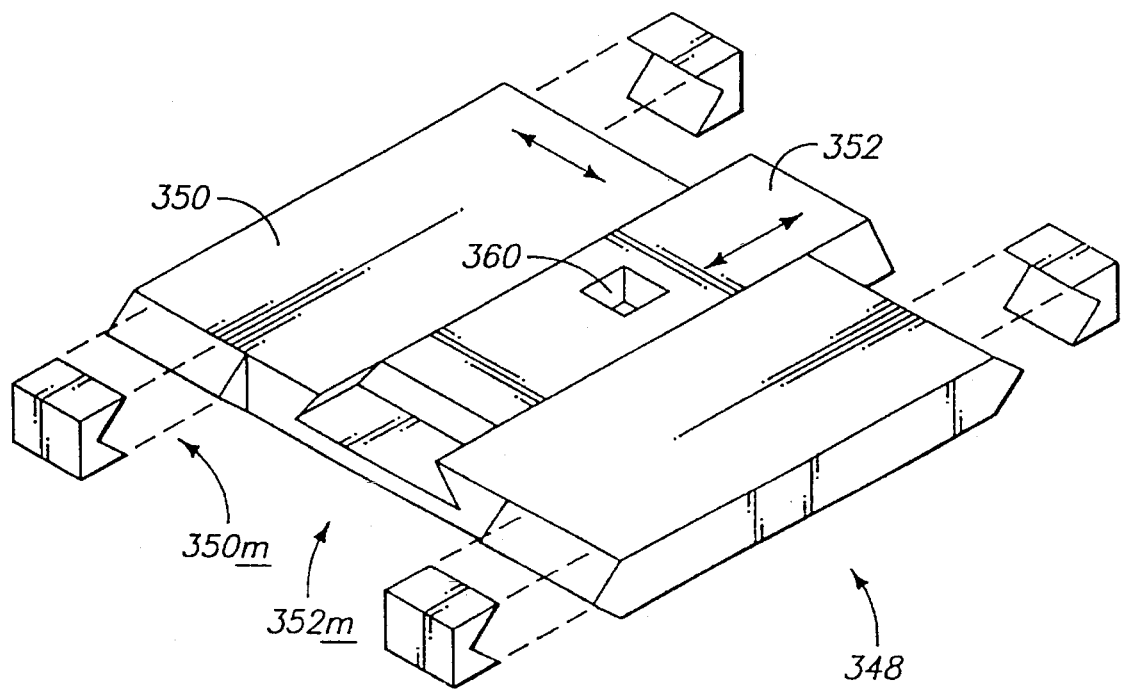

FIG. 5 *a* & *b* show perspective views of some possible arrangments of sliding-plate-linear-conversion means, specifically two different designs for the sliding actuator plates assembly 348. FIG. 5a. shows a tongue-in-groove type of embodiment where lesser sliding plate actuator 352 has two protruding tongue-like structures, one along each of its longer sides, which ride within grooves in greater sliding plate actuator 350. Greater sliding plate actuator 350 also has tongue like structures along its sides that are perpendicular to those on lesser sliding plate actuator 352 which fit into groove type fittings that would reside in or be integral parts of base assembly 214. FIG. 5b. shows the direction of travel of greater sliding plate actuator 350 and lesser sliding plate actuator 352 being reversed in direction but still equally functional, and yet another means for lesser sliding plate actuator 352m are shown, namely a dovetail type arrangement. This serves to emphasize the large number of potential variations on this theme. Additional examples might have lesser sliding plate 352 in a recess on the lower side of greater sliding plate 350 instead of on the upper side.

FIGS. 6, 7, & 8 show another embodiment of this invention, which is a twelve-sensor device. Each sensor is distinctly associated with a single orthogonal output vector. In FIG. 6, base assembly 214 is shown without a top. Base assembly 214 is shown as an essentially rectangular structure having suction cup mounts 212 at the bottom corners. However, base assembly 214 is in no way limited to being rectangular in shape. Inside base assembly 214 is shown a retaining shelf 216. Above retaining shelf 216 are positioned six sensors. In the vicinity of and essentially centered along the length of forward wall 215a is move forward sensor 178. In the vicinity of right wall 215b is move right sensor 180. In the vicinity of and essentially centered along the length of rear wall 215c is move back sensor 182. In the vicinity of the left wall 215d is move left sensor 184. Essentially facing each other and substantially perpendicular to move back sensor 182 are positioned turn right sensor 190 and turn left sensor 192. Sliding platform 205 is shown as an essentially large square-like structure with rounded corners, having a similarly shaped but smaller structure protruding from its rear corner. The shape of sliding platform 205 is not limited to the specific shaped described above, but can be quite diverse, as will be shown later in this teaching. Sliding platform 205 is suspended in a position neutral to and spatially separated from sensors 178 through 184, 190, 192, thus providing excellent sensor isolation from any crosstalk, vibration, or other undesired input. The suspension of sliding platform 205 is accomplished by retaining shelf 216 and four tension springs 177a. In order to be as friction-free as possible, sliding platform 205, may be made of very low surface-resistance material, such as Teflon or other materials having similar characteristics. The material means for low surface-resistance may also be applied as tape, runners, or feet for sliding platform 205. The low surface-resistance material means may also be applied to retaining shelf 216, and similar means may be applied to the bottom surface of the top of base assembly 214. Tension springs 177a are connected to the sides of sliding platform 205 essentially at the midpoints of each side. Tension springs 177a extend radially and are connected to four spring mounts 210a located on base assembly 214. Tension springs 177a perform a function that can be accomplished by other means, comprising the use of rubber, foam, or other resilient materials.

At the approximate center of sliding platform 205 is a square-shaped aperture through which passes vertically a square shaft 102c. One skilled in the art will easily recognize that square shaft 102c is not the only means for transferring rotational forces from shaft 102 to sliding platform 205, thus shaft 102 is not necessarily square-shaped.

Square shaft 102c extends below the sliding platform 205 into sub-assembly 222, which is fixed to the lower side of sliding platform 205. Sub-assembly 222 comprises means for support of a rigidly fixed lower shaft guide 224, move up sensor 186, move down sensor 188, and shaft actuator assembly 253. Resilient means keep shaft actuator tab 252 centered with space between move-up sensor 186 and move-down sensor 188.

Base assembly floor 217 is removeably attached to bottom of the base assembly 214, creating an enclosure in which interfacing circuitry 213 may be mounted.

The upper end of shaft 102c is fixed to partial spherical section 218, specifically, but not limited to lower partial sphere 218a. Protruding from lower partial sphere 218a, in the plane of the horizontal equator, are four actuator tabs 220a,b,c,d, extending orthogonally outward. Actuator tab 220a is located in a forward position, actuator 220b is located in a right position, actuator 220c is located in a rear position, and actuator 220d is located in a left position. Between opposite two of the actuator tabs 220 are two turn-stop ears 244, with a recess midway between actuator tabs 220. Turn-stop ears 244 extend outward from lower partial sphere 218a in the plane of its horizontal equator.

Fixed centrally to and rising vertically in lower partial sphere 218a is a lower pivot-spring cylinder 226 which ends at substantially the plane of the horizontal equator of lower partial sphere 218a. A sturdy pivot-spring 228 fits firmly into pivot-spring cylinder 226 and extends substantially above the end of pivot-spring cylinder 226. Pivot-spring 228 extends upward, fitting firmly into an upper pivot-spring cylinder 230 which is an integral part of upper platform 232. Fixed to upper platform 232 are four sensors, namely turn up sensor 194 positioned directly above the rear actuator 220c, turn down sensor 196 positioned directly above forward actuator tab 220a, turn clockwise sensor 198 positioned directly above right actuator tab 220b, and turn counter-clockwise sensor 200 positioned directly above left actuator tab 220d. Upper platform 232 attaches in a fixed manner to the inside of handle upper hemisphere 236. A tactile feedback means 234, a small electric motor with an offset weight on its shaft can be fixed either to upper platform 232 or to the inside of handle upper hemisphere 236. Handle upper hemisphere 236 comprises a centrally located upper cavity of sufficient volume for containing tactile feedback means 234, namely a small electric motor with an offset weight on its shaft and for allowing free rotation of the offset weight. A lower partial sphere 238 is fixed to handle upper hemisphere 236 in such a way as to form ball-shaped handle 100. Lower partial sphere 238 would be a complete lower partial sphere, except for a conical section removed from the lowest point of a lower partial sphere, thus allowing limited rotational movement of ball-shaped handle 100 in relation to square shaft 102c. On the inside of lower partial sphere 238 and immediately above the removed conical section is a partial inverse-sphere guide 240, which has substantially the same radius as the outside of lower partial sphere 218a. On the inside of lower partial sphere 238 and immediately above partial inverse-sphere guide 240 are four tab cavities, each associated with the area in which an actuator tab 220 resides, thus allowing free movement of actuator tabs 220. In between opposite two of the four tab cavities are ear cavities of similar vertical depth to the tab cavities, but having a smaller radius from the center of lower partial sphere 238. In the center of each ear cavity rises a turn-stop tab 242, which fits firmly between two turn-stop ears 244.

Operationally speaking, a linear force applied by a hand to the handle 100 is transferred directly to the square shaft 102c. If the linear force is applied in a forward, right, backward, or left direction (ie., a horizontal linear force), then the force is directly transferred from square shaft 102c to sliding platform 205, causing sliding platform 205 to move along the direction of the force to activate appropriate sensor 178, 180, 182, or 184. If the linear force is applied either upwardly or downwardly (ie., a vertical linear force), then the force directly causes shaft 102c to pass freely through the aperture in sliding platform 205, along the direction of the force, thus causing shaft actuator tab 252 to activate appropriate sensor 186 or 188.

Assuming a standard x, y, z coordinate system: A rotational force applied by a hand to handle 100 in either direction around the vertical y-axis (ie., turn left or turn right), is transferred from handle 100 through turn-stop tabs 242, and through turn-stop ears 244, and through lower partial sphere 218a, and through square shaft 102c, to sliding platform 205, thus causing sliding platform 205 to rotate and the smaller structure protruding from its rear corner to activate appropriate sensor 190 or 192. A rotational force applied by a hand to handle 100 in either direction around the horizontal x- or z-axis (ie., turn up, down, clockwise, counter-clockwise), causes handle 100 to rotate about the same axis as the force. A sensor 194, 196, 198, or 200, fixed inside moveable handle 100, is activated by substantially stationary actuator tab 220c, 220a, 220b, or 220d respectively.

Figure 9:
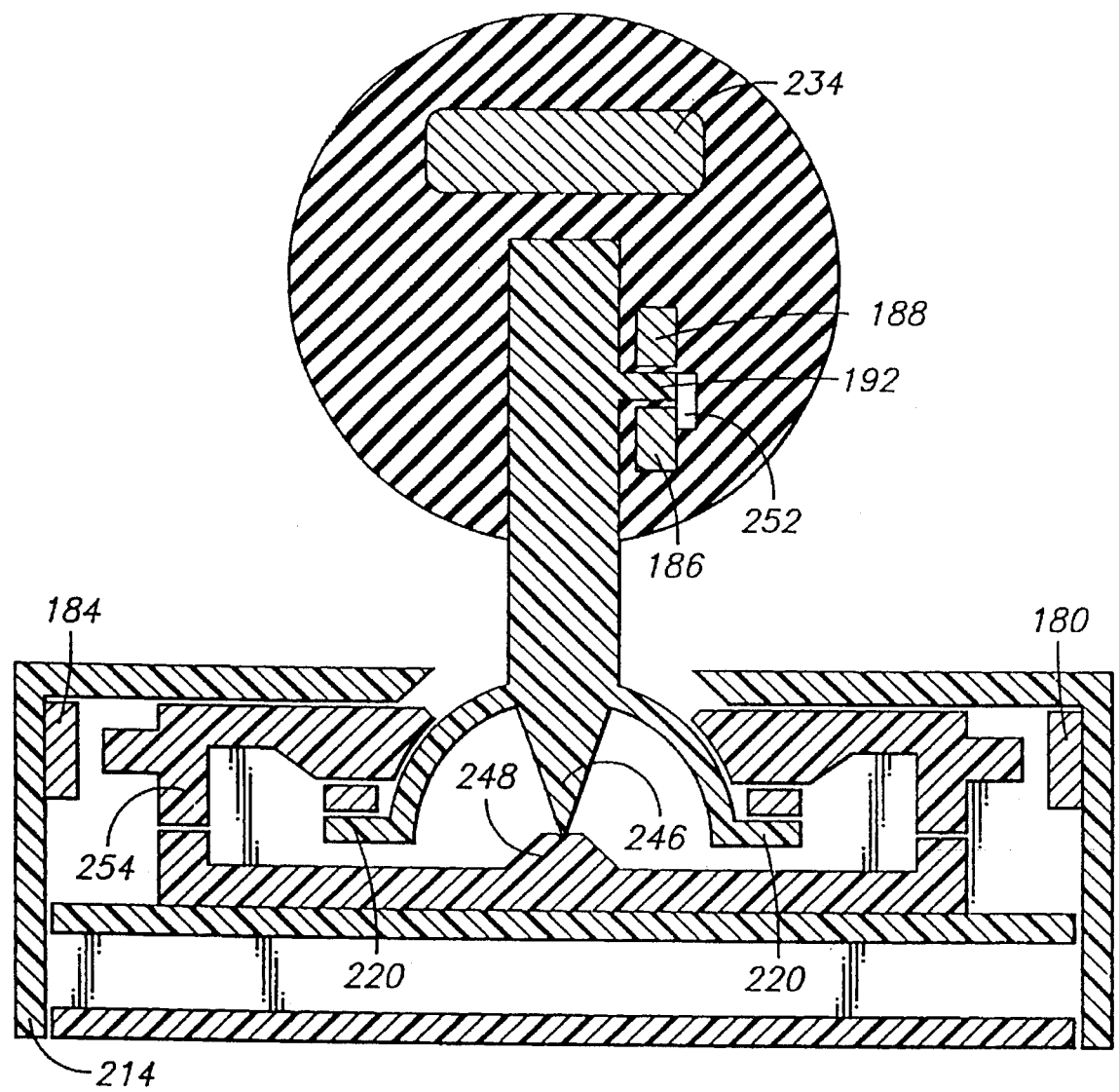
FIG. 9 shows a median section view of an inverted hemisphere embodiment having a mechanical pivot arrangement.

FIG. 9 shows an embodiment that has similarities to the preferred embodiments. The hemispherical assembly in the base of FIG. 9 is an inversion of that in the handle of the preferred embodiments, with sensor placements optionally either above or below actuator tabs 220. Instead of sliding plates actuator assembly 348 or sliding platform 205 used in the preferred embodiments, the design of FIG. 9 incorporates an actuator enclosure 254 that moves in a horizontal plane to activate sensors 178, 180, 182, 184, as shown in and described as the preferred embodiment in FIGS. 1 and 2. Actuator enclosure 254 is not limited to being of square shape, but it can be any of a great diversity of forms as will be obvious to one skilled in the art. In the lower portion of base assembly 214 is shown space sufficient for the containment of electronic interfacing circuitry.

Figures 10A, 10B:
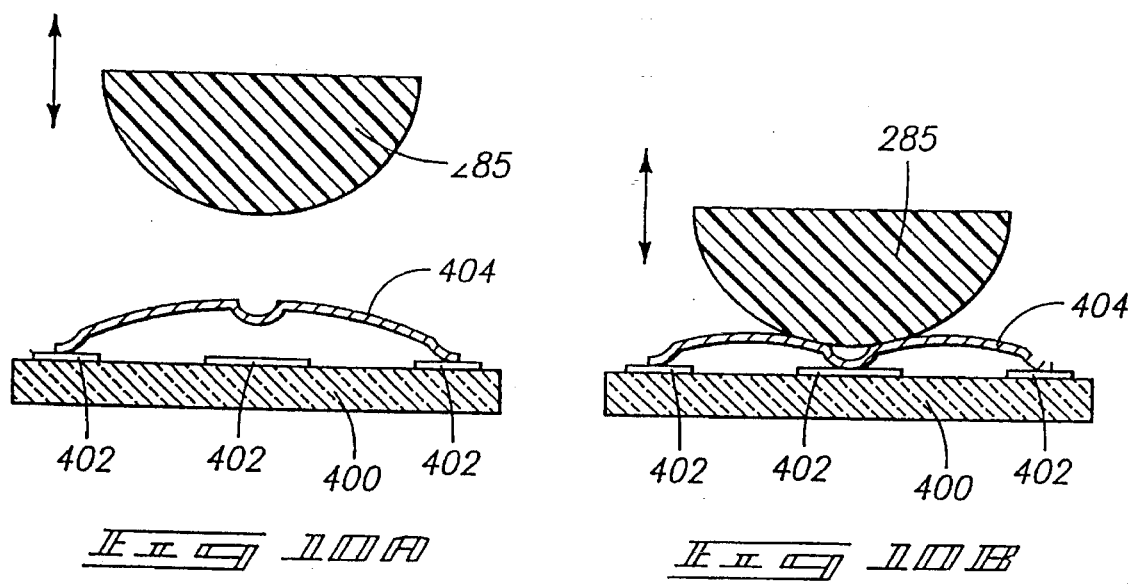
FIG. 10 a,b,c show a very simple, reliable contact sensor.
Figure 10C:
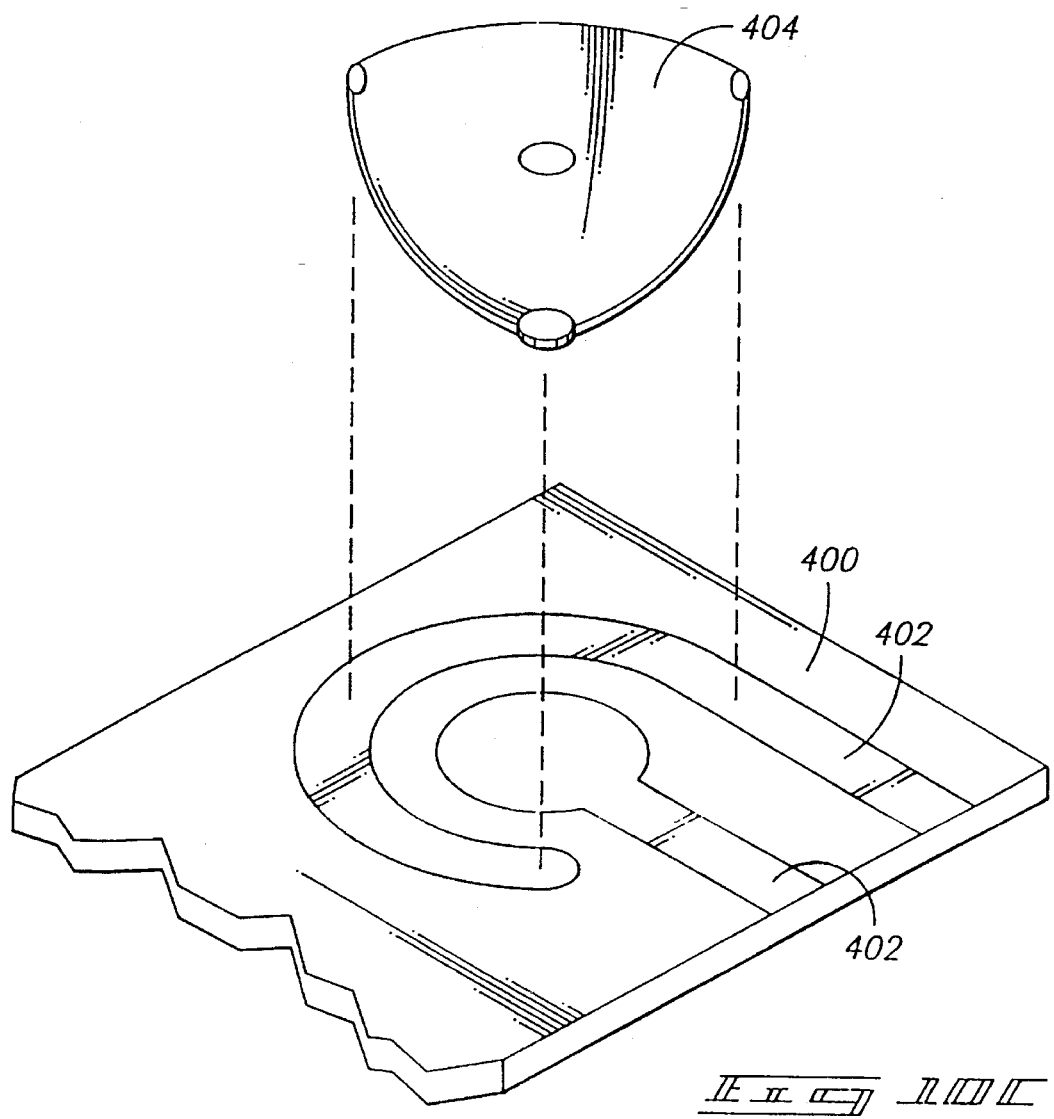

FIG. 10 *a,b,c* show an exceptionally simple, economical, durable and electrically clean sensor switch comprised of a circuit board 400, electrical traces 402 etched in such a pattern as to fit under the dimpled feet and dimpled central contact of a switch member 404 which is a concavely shaped piece of springy conductive metal which is held down to the circuit board by an over laying of adhesive tape. This sensor which is a normally open snap switch closeable with force applied thereto as indicated in the drawings, was observed in a Radio Shack 2D joystick covered only by a design patent showing the outer shape of the joystick handle, so this sensor is presumably in the public domain.

FIG. 11 shows some sensor types that are possible for use in the current art. Shown are a simple electrical contact sensor, a simple piezo contact sensor, a piezo resistive pressure sensor as manufactured by SENSYM, Inc. of Sunnyvale, Calif., a Hall Effect magnetic proximity sensor available from SPRAGUE Electric Co. of Concord, N.H., an integrated capacitive sensor, a separate capacitive sensor, and a "singing technology" sensor 305 as developed by Pennwalt Corp. of Valley Forge, Pa., all of which will be obvious to one skilled in the art.

Specifically, FIG. 11a shows a simple electrical contact sensor means having an electrically active activator 281 spatially separated from an electric contact surface 282 which is fixed to a sensor mount 202.

Shown in FIG. 11b is a simple piezo contact sensor means having an actuator 285 spatially separated from a piezo contact sensor 286 which is fixed to sensor mount 202.

Shown in FIG. 11c shows a piezo resistive pressure sensor means having actuator 285 spatially separated from a piezo resistive pressure sensor 289 which is fixed to sensor mount 202.

Shown in FIG. 11d is a Hall Effect magnetic proximity sensor means having a magnetic actuator 295, spatially separated by resilient means 250 from a Hall Effect magnetic proximity sensor 293 which is fixed to sensor mount 202.

Shown in FIG. 11e is a Hall Effect magnetic proximity sensor means having a ferrous actuator 291, spatially separated by resilient means 250 from a Hall Effect magnetic proximity sensor 293 having a rear mounted magnet 294.

Shown in FIG. 11f is an integrated capacitive sensor means having a polarized actuator 297 spatially separated by dielectric resilient means 299 from a capacitive surface 298 fixed to sensor mount 202.

Shown in FIG. 11g is a separate capacitive sensor means having actuator 285 spatially separated from a compressible capacitive sensor 301 which is fixed to sensor mount 202. Compressible capacitive sensor 301 comprises two capacitive surfaces. 298 separated by a dielectric resilient means 299 and enclosed by a flexible hermetically sealed wrapper 300.

Shown in FIG. 11h is a "singing technology" sensor 305 which is fixed to sensor mount 202 at both of its linear ends. Singing sensor 305 could be mounted from a single end. Sensors of this type are a piezo electric film sandwich with KYNAR® piezo film attached to both sides of a spring steel element, which is induced to resonate at a frequency dependent on the load applied to sensor 305.

CONCLUSION

Thus the reader will see that the 6 degree of freedom input device shown as this invention enables a highly reliable, functional, and exceptionally economical device that is forgiving of human inaccuracies of the hand and precise in interpreting the user's intended input. Also with this art is the capability of tactile feedback to the hand.

While the above description and the accompanying figures show many specificities, these should not be construed as limiting the scope of the invention. The embodiments shown are but examples of the claimed art as one skilled in the art will see that many other variations are possible. For example the sliding plates assembly 348 in base 214 of FIGS. 1 and 2 might have the lesser plate 350 below the greater plate 354 rather than above it, or sub assembly 222 might be reside above lesser plate 350 rather than below it as illustrated. Handle 100 pivot mechanism means and actuator means of the embodiment shown in FIGS. 1,2,& 3 are structurally completely different from those of the embodiment of FIGS. 5,6,& 7, while remaining functionally identical. Handle 100 might not be ball-shaped but rather shaped like a joystick handle. Thus, the scope of this invention should be determined not by a strict interpretation of the shown figures, rather the scope should be determined by the claims and their legal equivalents.

I claim:

1. A hand-operated controller allowing six degrees of freedom of hand input force into a single handle for conversion of the hand input force into electrical output signals, said controller comprising;

stationary base means including a first portion of said base means and a horizontally positioned second portion of said base means for supporting sliding-plate-linear-conversion means for moving within a horizontal first linear degree of freedom and a horizontal second linear degree of freedom of said six degrees of freedom and for actuating linear sensor means for sensing positions of said sliding-plate-linear-conversion means within the horizontal first and second linear degrees of freedom and for producing electrical output signals related to sensed positions of said sliding-plate-linear-conversion means;

said sliding-plate-linear-conversion means sandwiched between said first portion of said base means and said horizontally positioned second portion of said base means and thereby restrained against upward and downward movement;

a shaft coupled to said sliding-plate-linear-conversion means to move with said sliding-plate-linear-conversion means at least in the horizontal first and second linear degrees of freedom;

said shaft having said single handle on an upper end of said shaft to allow all of said six degrees of freedom of hand input force to be applied to said controller through said single handle;

means for transferring horizontal linear hand input force applied to said single handle directionally correspondingly to the horizontal first and second linear degrees of freedom into directionally corresponding horizontal linear force against said shaft, whereby with said shaft being coupled at least in the horizontal first and second linear degrees of freedom to said sliding-plate-linear-conversion means, the shaft can transfer horizontal linear force applied to said single handle into said sliding-plate-linear-conversion means so as to move said sliding-plate-linear-conversion means in the horizontal first and second linear degrees of freedom in a substantially identical direction as the direction of the horizontal linear hand input force applied to said single handle;

means for allowing said single handle to be rotatable in three separate degrees of rotational freedom about a single point defined by an intersection of three mutually perpendicular axes within said single handle, whereby three degrees of rotational freedom of said six degrees of freedom are provided;

rotational force sensor means for sensing rotational force against said single handle in any of said three degrees of rotational freedom, and for producing electrical output signals related to sensed rotational force against said single handle, means for allowing said single handle to be moved vertically upward and downward in a third linear degree of freedom of said six degrees of freedom by vertical hand input force against said single handle, up and down movement sensor means for sensing upward and downward movement of said single handle in said third linear degree of freedom and for producing electrical output signals related to sensed upward and downward movement of said single handle.

2. A controller in accordance with claim 1 further including spatial isolation means in association with said linear sensor means, said rotational force sensor means and said up and down movement sensor means.

3. A controller in accordance with claim 2 wherein said linear sensor means is more narrowly defined as an independent first sensor and an independent second sensor each associated with the horizontal first linear degree of freedom;

and further, an independent third sensor and an independent fourth sensor each associated with the horizontal second linear degree of freedom;

the independent first through fourth sensors each being separate and distinct from one another.

4. A controller in accordance with claim 3 wherein said rotational force sensor means is more narrowly defined as six independent sensors each separate and distinct from one another, and each separate and distinct from said independent first through fourth sensors.

5. A controller in accordance with claim 4 wherein said up and down movement sensor means is more narrowly defined as two independent sensors each separate and distinct from one another, separate and distinct from said six independent sensors, and separate and distinct from said independent first through fourth sensors.

6. A controller in accordance with claim 5 wherein said independent first through fourth sensors, and said six independent sensors and said two independent sensors all jointly comprise twelve sensors each being separate and distinct from one another;

each separate and distinct sensor of said twelve sensors is an electricity manipulating sensor each capable of manipulating electricity independently of the other sensors of said twelve sensors.

7. A controller in accordance with claim 6 wherein said twelve sensors are each electrical contact switches.

8. A controller in accordance with claim 7 wherein each switch of the twelve electrical contact switches is an open switch closeable with force applied thereto.

9. A controller in accordance with claim 8 further including tactile feedback means for providing vibration which can be felt through said single handle.

10. A hand-operated controller allowing six degrees of freedom of hand inputs for conversion of the hand inputs into twelve orthogonal outputs each dependant upon hand inputs, with the twelve orthogonal outputs each represented by an electrical output signal each produced by one of twelve separate sensors attached to said controller, with each of said sensors associated one said sensor per each orthogonal output of said twelve orthogonal outputs, said controller comprising;

a stationary base for supporting sliding-plate-linear-conversion means movably sandwiched between a first portion and a second portion of said base; said sliding-plate-linear-conversion means movable in a first linear degree of freedom and in a second linear degree of freedom of said six degrees of freedom for actuating a first four sensors of said twelve separate sensors;

said first four sensors mounted within said base;

said first four sensors including a move-forward sensor associated with a first output of said twelve orthogonal outputs;

said first four sensors including a move-back sensor associated with a second output of said twelve orthogonal outputs;

said first four sensors including a move-right sensor associated with a third output of said twelve orthogonal outputs;

said first four sensors including a move-left sensor associated with a fourth output of said twelve orthogonal outputs;

said sliding-plate-linear-conversion means sandwiched between said first portion and said second portion of said base so that said sliding-plate-linear-conversion means is moveable exclusively horizontally to and from actuation of each of the sensors of said first four sensors;

a shaft; said shaft having a lower end and an upper end;

the lower end of said shaft coupled to said sliding-plate-linear-conversion means so that said shaft is coupled with said sliding-plate-linear-conversion means to move in the first and second linear degrees of freedom so that linear horizontal movements of said shaft can be translated into linear horizontal movements of said sliding-plate-linear-conversion means to move said sliding-plate-linear-conversion means to and from actuation of each of the sensors of said first four sensors;

a handle on said upper end of said shaft, said handle manipulable by human hand inputs for applying all of said six degrees of freedom of hand inputs into said controller;

means for allowing said handle to be rotatable in three degrees of rotational freedom about a single point defined by an intersection of three mutually perpendicular axes within said handle, whereby three degrees of rotational freedom of said six degrees of freedom are provided;

a second four sensors of said twelve separate sensors, said second four sensors mounted within said handle and associated with at least two rotational degrees of freedom of said three degrees of rotational freedom;

said second four sensors including a turn-up sensor associated with
a fifth output of said twelve orthogonal outputs;

said second four sensors including a turn-down sensor associated with
a sixth output of said twelve orthogonal outputs;

said second four sensors including a turn clockwise sensor associated with
a seventh output of said twelve orthogonal outputs;

said second four sensors including a turn counter-clockwise sensor associated with
an eighth output of said twelve orthogonal outputs;

said controller including a turn-right sensor associated with
a ninth output of said twelve orthogonal outputs; said ninth output associated with a third degree of rotational freedom separate from said two rotational degrees of freedom;

said controller including a turn-left sensor associated with
a tenth output of said twelve orthogonal outputs; said tenth output associated with said third degree of rotational freedom;

means for allowing said handle to be moved vertically up and down in a third linear degree of freedom separate from the first and second linear degrees of freedom of said six degrees of freedom;

said controller including a move down sensor and a move up sensor each associated with said third linear degree of freedom of said six degrees of freedom;

said move down sensor associated with an eleventh output of said twelve orthogonal outputs;

said move up sensor associated with a twelfth output of said twelve orthogonal outputs.

11. A controller in accordance with claim 10 wherein each sensor of said twelve separate sensors is an electrical contact switch with the contacts in an open position and being closeable with force.

12. A controller in accordance with claim 11 further including
spatial isolation means in association with each switch of the twelve switches.

13. A controller in accordance with claim 12 further including tactile feedback means for providing vibration which can be felt through said handle.

14. A hand-operated controller allowing six bi-directional degrees of freedom of hand input force into a single handle, said controller comprising;

said single handle movably supported by
means for converting hand input force applied in any direction to said single handle into movement of said single handle in a direction substantially identical to the hand input force direction and relative to
a stationary support base of said controller; whereby linear hand input force against said single handle absent rotational force can move said single handle purely linearly, and rotational hand input force against said single handle absent linear force can move said single handle purely rotationally;

linear sensor means for sensing only linear movement of said single handle and producing electrical output signals indicative of linear hand input force direction against said single handle;

rotational sensor means for sensing only rotational movement of said single handle and producing electrical output signals indicative of rotational hand input force direction against said single handle.

15. An improved hand operated controller of the type allowing six degrees of bi-directional freedom of hand inputs for conversion of the hand inputs into electrical outputs;
wherein the improvement comprises the use of a separate and distinct sensor for each direction of each bi-directional degree of freedom of said six degrees of freedom; whereby twelve separate and distinct sensors are utilized for converting hand inputs into said electrical outputs.

16. An improved six degree of freedom controller in accordance with claim 15 wherein each sensor of the twelve sensors is an electrical contact switch.

17. An improved six degree of freedom controller in accordance with claim 16 further including tactile feedback means for providing vibration to be felt by a hand operating said controller.

18. A controller in accordance with claim 17 further including
spatial isolation means in association with each switch of the twelve switches.

* * * * *